United States Patent
Wang

(10) Patent No.: US 8,165,037 B2
(45) Date of Patent: Apr. 24, 2012

(54) METHOD FOR SWITCHING COMMUNICATION NETWORKS

(75) Inventor: John C. Wang, Taoyuan (TW)

(73) Assignee: HTC Corporation, Taoyuan (TW)

( * ) Notice: Subject to any disclaimer, the term of this patent is extended or adjusted under 35 U.S.C. 154(b) by 338 days.

(21) Appl. No.: 11/788,734

(22) Filed: Apr. 20, 2007

(65) Prior Publication Data

US 2007/0268842 A1 Nov. 22, 2007

(30) Foreign Application Priority Data

Apr. 20, 2006 (TW) ................................ 95114174 A

(51) Int. Cl.
*H04L 12/28* (2006.01)
(52) U.S. Cl. ...................................................... 370/254
(58) Field of Classification Search .................. None
See application file for complete search history.

(56) References Cited

U.S. PATENT DOCUMENTS

| | | | |
|---|---|---|---|
| 6,101,251 A * | 8/2000 | Strickland | 379/213.01 |
| 2002/0085516 A1 * | 7/2002 | Bridgelall | 370/329 |
| 2003/0174821 A1 * | 9/2003 | Bates et al. | 379/114.15 |
| 2004/0120498 A1 * | 6/2004 | Sylvain | 379/221.01 |
| 2004/0196810 A1 | 10/2004 | Kil et al. | |
| 2004/0255192 A1 * | 12/2004 | Watanabe et al. | 714/25 |
| 2005/0249196 A1 * | 11/2005 | Ansari et al. | 370/352 |
| 2005/0285934 A1 | 12/2005 | Carter | |
| 2006/0050720 A1 * | 3/2006 | Zaitsu | 370/401 |
| 2006/0256751 A1 * | 11/2006 | Jagadeesan et al. | 370/331 |

FOREIGN PATENT DOCUMENTS

| | | |
|---|---|---|
| EP | 1389852 | 2/2004 |
| EP | 1517575 | 3/2005 |
| JP | 200503325 A | 2/2005 |
| JP | 2006100905 A | 4/2006 |
| TW | 200513094 | 4/2005 |
| TW | 200610333 | 3/2006 |
| WO | WO0171994 | 9/2001 |
| WO | WO03030070 A1 | 4/2003 |
| WO | WO2005007043 | 8/2005 |

* cited by examiner

*Primary Examiner* — Chirag Shah
*Assistant Examiner* — Minh-Trang Nguyen
(74) *Attorney, Agent, or Firm* — Kinney & Lange, P.A.

(57) ABSTRACT

A method for switching communication network used in a first electronic device which is able to access many kinds of communication networks is disclosed. If the first electronic device receives a switching instruction at a time when a communication link and a data transmission have been established between the first electronic device and a second electronic device via a first communication network. Firstly, the first electronic device obtains an identification number of a third electronic device for use in a second communication network. Then, the communication link is established between the first electronic device and the third electronic device via the second communication network according to the identification number. Finally, the data is transmitted using the communication link between the first electronic device and the third electronic device via the second communication network, and disconnects the original communication link via the first communication link.

28 Claims, 3 Drawing Sheets

METHOD FOR SWITCHING COMMUNICATION NETWORKS

RELATED APPLICATIONS

This application claims priority to Taiwan Application Serial Number 95114174, filed Apr. 20, 2006, which is herein incorporated by reference.

BACKGROUND

1. Field of Invention

The present invention relates to a switching method for communication networks. More particularly, the present invention relates to a switching method between different communication networks for data transmission between portable electronic devices.

2. Description of Related Art

Portable electronic devices have undergone rapid development over the past few years, following advances in software and hardware which have resulted in electronic devices with multi-purpose functionalities. For example, the smart cell phone or the smart personal assistant product integrates the functionalities of the mobile telephone, digital camera and the digital personal assistant into one portable electronic device.

The characteristic of the foregoing portable electronic devices which allows the devices to perform a variety of the application programs similar to a personal computer system, is the ability to use the computer network system and the telephone network system concurrently for communication. The user can choose the communication method of the computer network or the telephone network according to his/her own needs to communicate with another user.

FIG. 1 is a schematic diagram illustrating the communication of the foregoing smart electronic device and other electronic devices. The user 102 uses a smart electronic device 104 to communicate with the user 120 and the smart electronic device 104 has the ability to communicate using the telephone network 106 and the computer network 108. Therefore, the user 102 can choose a suitable network system to communicate with the user 120 according to the device used by the user 120. For example, if the user 120 uses the conventional household telephone 110 or the cell phone 112, then the user 102 must choose the telephone network 106 to communicate with the user 120. If the user 120 uses the conventional personal computer 114, then the user 102 must choose the computer network 108 to communicate with the user 120. If the user 120 uses a smart electronic device 118, then the communication media between the user 102 and the user 120 can be either the telephone network 106 or the computer network 108.

The communication methods and the characteristics of the computer network and the telephone network are different. The advantage of transmitting data via the computer network is that it is more cost-effective. Therefore, in normal conditions, especially when voice communication is used, the first choice for the user to communicate with another user is via the computer network. However, the telephone network range is far more extensive than the computer network and communication via the telephone network is currently more convenient. In the foregoing condition, for example, suppose the user 102 of FIG. 1 uses the smart electronic device 104 to talk to the user 120 on the move via the computer network 108. However, if the user 102 moves to an area not covered by the computer network 108, and then the communication link via the computer network 108 is disconnected, the user 102 must reconnect the smart electronic device 104 to the user 120 via the telephone network 106 in order to continue the voice communication.

Although the Unlicensed Mobile Access (UMA) technique can be implemented in order to solve the foregoing problem, the UMA technique relies on automatically maintaining the communication link on the telephone network or the computer network (in other words, switching between the communication network) to avoid establishing a new communication link. Therefore, the UMA requires an improvement for the entire infrastructure of the telephone network and the computer network, which requires a lot of capital cost and time. For practical uses, the UMA technique still has a lot of areas that can improve.

SUMMARY

It is therefore an aspect of the present invention to provide a switching communication method for a portable electronic device.

It is another aspect of the present invention to provide a method to reduce the requirement for reestablishing the communication link for a portable electronic device.

It is still another aspect of the present invention to provide a method to fit in with the switching of the voice communication network according to the habit of the user.

In accordance with the foregoing and other aspects of the present invention, the present invention of a switching method in one embodiment is implemented in a first electronic device, and the first electronic device is capable of connecting to a first communication network or a second communication network. A communication link and a data transmission have been established between the first electronic device and a second electronic device via the first communication network. Firstly, the first electronic device obtains an identification number of a third electronic device for use in the second communication network. Before the foregoing step, the first electronic device looks up the identification number from the built-in telecommunication address book software automatically or the identification number is manually inputted after a switching instruction is received. The first electronic device then sends a linking request according to the identification number to the third electronic device via the second communication network. When the third electronic device accepts the linking request, then a communication link is automatically established between the first electronic device and the third electronic device via the second communication network. The communication link to the first communication network can be disconnected for the first electronic device. When this occurs, the data transmission between the first electronic device and the second electronic device, for example, the voice communication can be swiftly switched from the first communication network to the second communication network and the transmission can be continued between the first electronic device and the third electronic device. The user of the first electronic device therefore does not need to disconnect and reestablish the communication link for the data transmission, which consequently shortens the time required for switching between the communication networks.

It is to be understood that both the foregoing general description and the following detailed description are by example, and are intended to provide further explanation without limitation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention. In the drawings.

DESCRIPTION OF THE PREFERRED EMBODIMENTS

Figure 1:
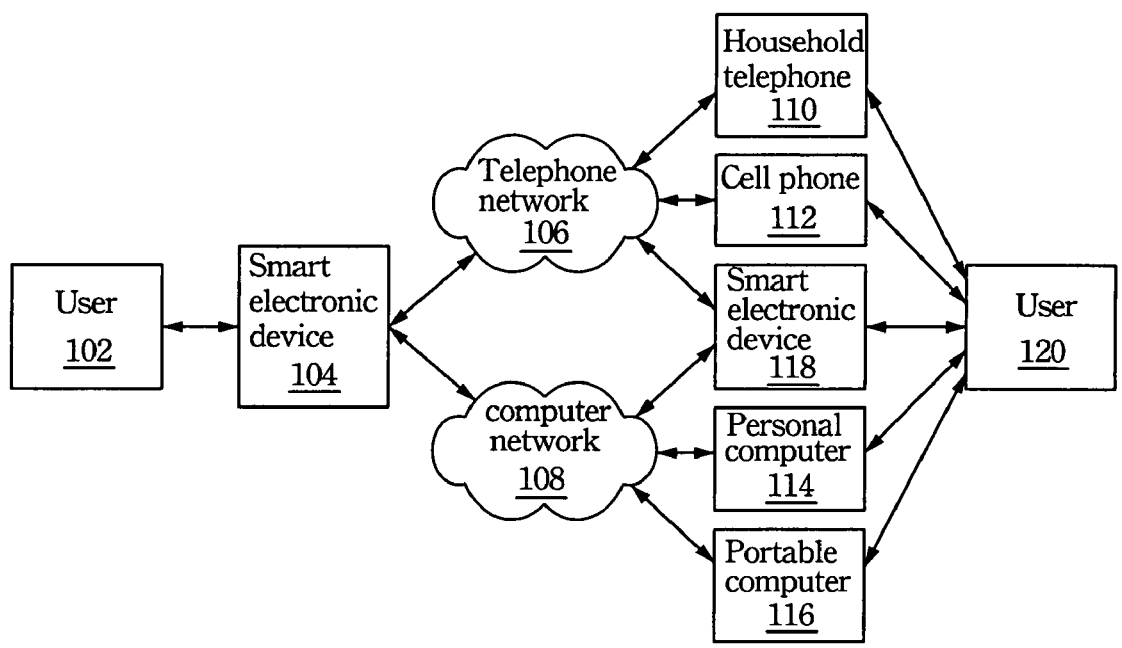
FIG. 1 is a schematic diagram between the various electronic devices of the communication network.

Reference will now be made in detail to the present preferred embodiments of the invention, examples of which are illustrated in the accompanying drawings. Wherever possible, the same reference numbers are used in the drawings and the description to refer to the same or like parts.

Figure 2:
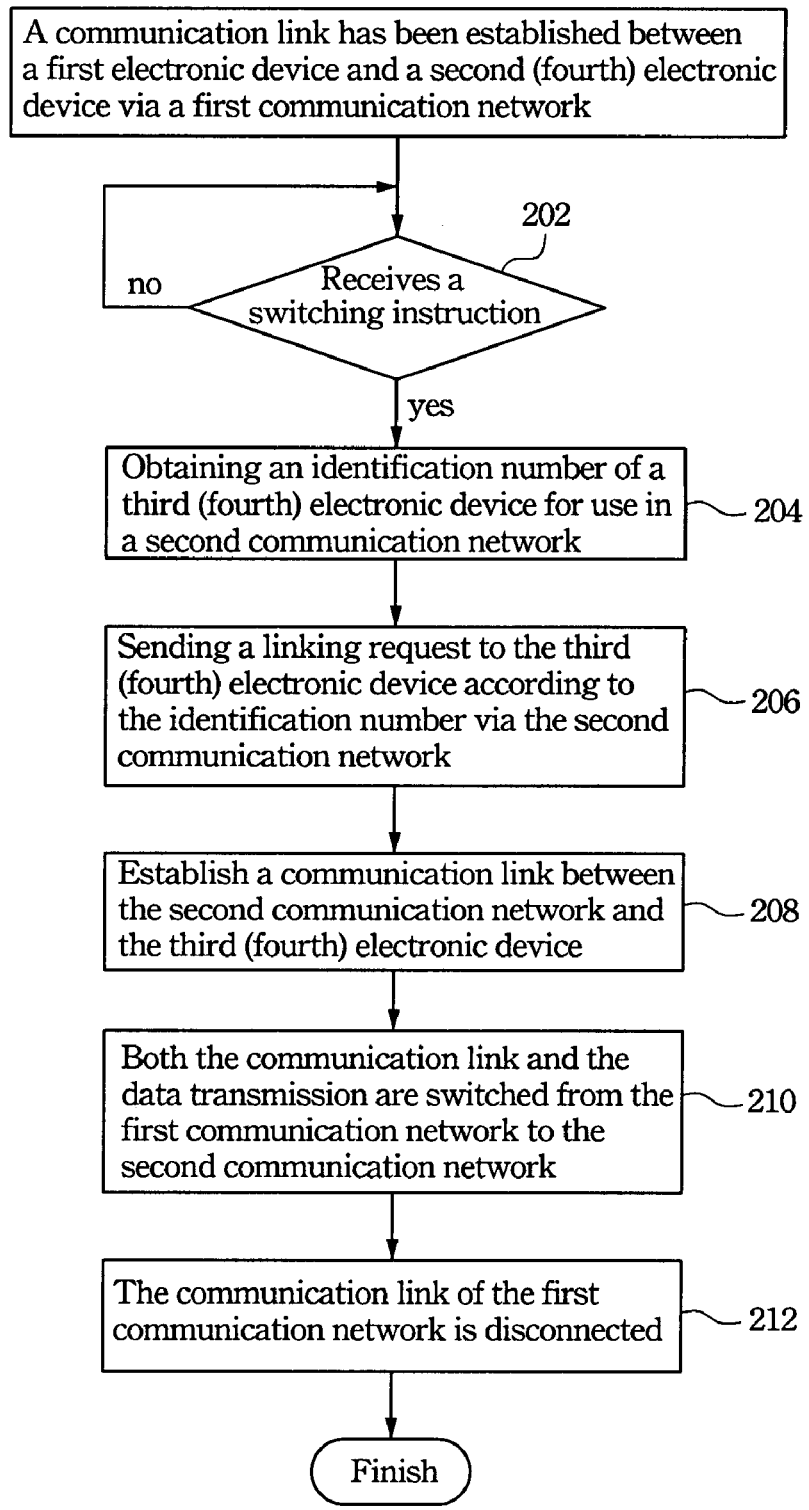
FIG. 2 is a flowchart according to one embodiment of this invention.

FIG. 2 illustrates a method flowchart according to one embodiment of the present invention. The method uses a first electronic device (similar to the smart electronic device 104 of FIG. 1), and the first electronic device is capable of connecting to at least a first communication network (similar to the computer network 108 of FIG. 1) and a second communication network (similar to the telephone network 106 of FIG. 1). A communication link and a data transmission (for example, voice communication) have been established between the first electronic device and a second electronic device (similar to the personal computer 114 or the portable computer 116 of FIG. 1) via the first communication network. Then, the method of the flowchart in FIG. 2 is applied to establish another communication link between the first electronic device and a third electronic device (similar to the household telephone 110 or the cell phone 112) via the second communication network. The unfinished data transmission originally communicates between the first electronic device and the second electronic device and is then transferred to the communication link between the first electronic device and the third electronic device in order to finish the data transmission.

If the first electronic device attempts to establish the communication link with the third electronic device via the second communication network, as shown in step 204, then the first electronic device must obtain an identification number for the third electronic device for use in the second communication network. For example, if the second communication network is a telephone network, then the identification number can be a telephone number; if the second communication network is a computer network, then the identification number is a network IP address, an email address or an account number for the communication software. In this embodiment, the first electronic device may obtain the identification number from either being manually input from the user or through looking the identification number up from the built-in telecommunication address book software.

The preferred step is the first electronic device only performs step 204 after receiving a switching instruction, which requires determining whether the first electronic device receives the switching instruction prior to obtaining the identification number. The switching instruction can be generated by a button or a hot key from the first electronic device (for example, the user of the first electronic device).

Step 206 shows the first electronic device sends a linking request to the third electronic device via the second communication network after the first electronic device obtains the identification number of the third electronic device for use in the second communication network. Step 208 shows a communication link is successfully established between the first electronic device and the third electronic device via the second communication network after the third electronic device accepts the linking request.

At any time, the communication link between the first electronic device and the second electronic device may be disconnected due to various reasons (for example, the first electronic device is out of the coverage range for the first communication network). Therefore, the unfinished data transmission (for example, the voice communication) between the first electronic device and the second electronic device is transferred to the communication link between the first electronic device and the third electronic device via the second communication network. In other words, in the voice communication condition, the user dialogue originally performed between the first electronic device and the second electronic device can be immediately transferred to the communication link between the first electronic device and the third electronic device. Step 212 shows the disconnection between the first electronic device and the second electronic device after the successfully transferring the communication link and the data transmission.

In the foregoing method, suppose the second electronic device and the third electronic device are common communication network terminal devices (for example, a household telephone, a cell phone, a personal computer or a portable computer). Supposed a fourth electronic device and the first electronic device have established the communication link in another embodiment of the present invention. The fourth electronic device is capable of connecting to at least the first communication network and the second communication network (similar to the smart electronic device 118 shown in FIG. 1). In other words, the communication link may be established between the first electronic device and the fourth electronic device via the first communication network or the second communication network.

In this scenario, according to the steps of the FIG. 2, both the communication link and the data transmission are switched from the first communication network to the second communication network after the communication link is established between the first electronic device and the fourth electronic device via the first communication network. The main difference that this embodiment adds to the method shown in FIG. 2 is that an identification number of the fourth electronic device for use in the second communication network may be obtained through notifying the fourth electronic device, in addition to obtaining the identification number from being manually input by the user or the look up from the built-in communication address book software.

Figure 3:
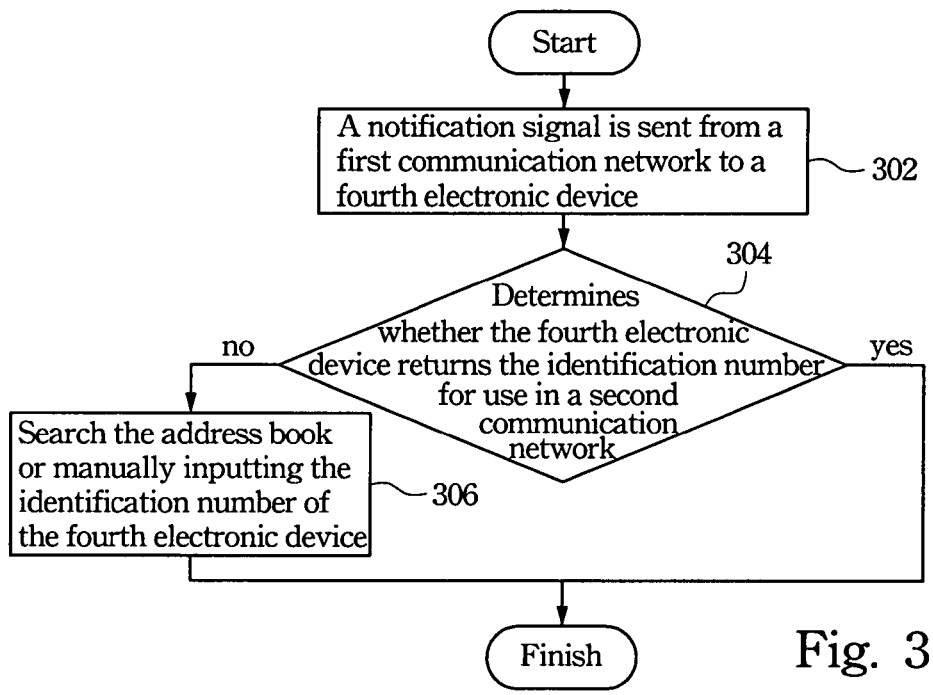
FIG. 3 is a flowchart according to another embodiment of this invention.

FIG. 3 illustrates a notification signal is sent from the first electronic device via the first communication network in step 302 in order to notify the fourth electronic device about the switching of the communication link in advance. In steps 304, it is determined whether the fourth electronic device returns the identification number for use in the second communication network to the first electronic device. If the fourth electronic device returns the identification number, then the first electronic device successfully receives the identification number of the fourth electronic device. If the fourth electronic device does not return the identification number, then in step 306, for example, the identification number is obtained from inputting by the user, or the look-up from the built-in communication address book software in order to obtain the identification number from the fourth electronic device.

Figure 4:
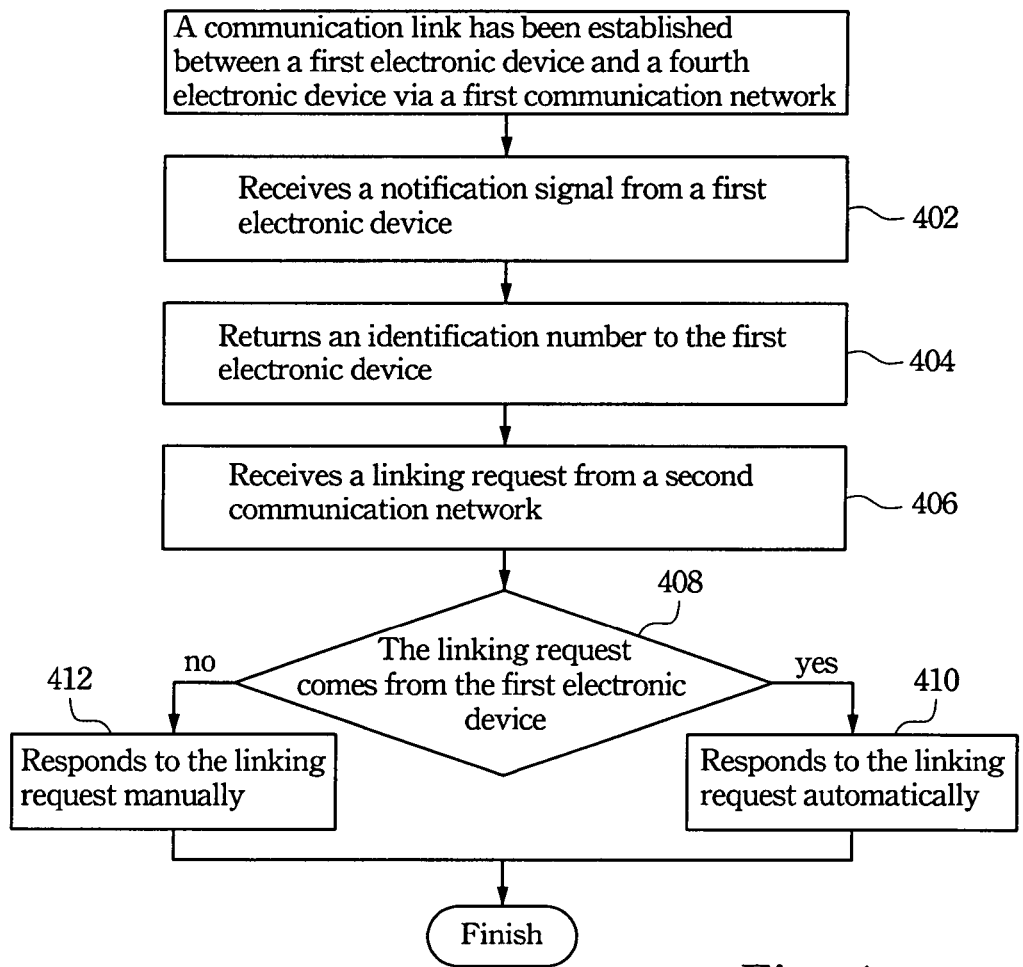
FIG. 4 is a flowchart according to still another embodiment of this invention.

In the case where, the third electronic device is a common network communication terminal device, the user requires the manual operation of the third electronic device after receiving the linking request from the first electronic device illustrated in the method flowchart in FIG. 2. However, the fourth electronic device may integrate the automatic response functionality to respond to the linking request in FIG. 4 to further increase operating convenience.

The method flowchart of FIG. 3 illustrates the first electronic device sends a notification signal before the switching of the communication link. Therefore, the fourth electronic device receives the notification signal in step 402 of FIG. 4. The notification signal, for example, may include the identification number of the first electronic device for use in the second communication network. Then, the fourth electronic device returns its identification number for use in the second communication network to the first electronic device in step 404. The fourth electronic device receives a linking request from the second communication network in step 406. Then in step 408, it is determined whether the identification number from the linking request is the same as the identification number of the first electronic device. If both the identification numbers are the same, then the linking request is from the first electronic device, which can respond to the linking request automatically in step 410. If both the identification numbers are different (step 412), then the linking request is not from the first electronic device, which requires the user to manually decide whether to respond to the linking request or to reject the linking request.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A method for switching communication network used in a first electronic device, wherein the first electronic device is capable of connecting to at least a first communication network and a second communication network, the method comprising:

using the first communication network to obtain an identification number of a third electronic device from a second electronic device by the first electronic device for using in the second communication network when a communication link with a data transmission is established to the second electronic device via the first communication network;

sending a linking request according to the identification number to the third electronic device via the second communication network;

establishing a communication link to the third electronic device via the second communication network;

transferring the data transmission from the communication link to the second electronic device via the first communication network to the communication link to the third electronic device via the second communication network; and disconnecting the communication link to the second electronic device via the first communication link.

2. The method of claim 1, further comprises receiving a switching instruction before obtaining the identification number.

3. The method of claim 2, wherein the switching instruction is generated by a button or a hot key of the first electronic device.

4. The method of claim 1, further comprises disconnection of the communication link with the second electronic device via the first communication network after transferring the data transmission to the second communication network.

5. The method of claim 1, wherein the identification number is obtained by keying in the identification number by the user, or look up from the built-in telecommunication address book software.

6. The method of claim 1, wherein the data is a voice data.

7. The method of claim 1, wherein the first communication network is a computer network.

8. The method of claim 1, wherein the second communication network is a telephone network.

9. The method of claim 1, wherein the second electronic device is a personal computer or a portable computer.

10. The method of claim 1, wherein the third electronic device is a household telephone or a mobile telephone.

11. The method of claim 1, wherein the identification number is a telephone number, a network IP address, an email address or an account number of the telecommunication software.

12. A method for switching communication network used in a first electronic device, wherein the first electronic device and a fourth electronic device are capable of connecting to at least a first communication network and a second communication network, the method comprising:

sending a notification signal to the fourth electronic device through the first communication network when there is a communication link with a data transmission established between the first electronic device and the fourth electronic device via the first communication network;

obtaining an identification number of the fourth electronic device for use in the second communication network through the first communication network;

sending a linking request according to the identification number to the fourth electronic device via the second communication network;

establishing a communication link to the fourth electronic device via the second communication network;

transferring the data transmission from the communication link to the fourth electronic device via the first communication network to the communication link to the fourth electronic device via the second communication network; and disconnecting the communication link between the first electronic device and the fourth electronic device via the first communication network.

13. The method of claim 12, further comprises receiving a switching instruction before obtaining the identification number.

14. The method of claim 13, wherein the switching instruction is generated by a button or a hot key of the first electronic device.

15. The method of claim 12, further comprises disconnection of the communication link with the fourth electronic device via the first communication network after transferring the data transmission.

16. The method of claim 12, wherein the identification number is obtained by keying in the identification number by the user, or look up from the built-in telecommunication address book software.

17. The method of claim 12, wherein the method of obtaining the identification number further comprises:

generating a notification signal at the first communication network to the fourth electronic device; and receiving the identification number from the fourth electronic device.

18. The method of claim 12, wherein the data is a voice data.

19. The method of claim 12, wherein the first communication network is a computer network.

20. The method of claim 12, wherein the second communication network is a telephone network.

21. The method of claim 12, wherein the identification number is a telephone number, a network IP address, an email address or an account number of the telecommunication software.

22. A method for responding to a communication network used in a fourth electronic device, wherein a first electronic device and the fourth electronic device are capable of connecting to at least a first communication network and a second communication network, the method comprising:

obtaining a notification signal from the first electronic device through the first communication network when there is a communication link established between the first electronic device and the fourth electronic device via the first communication network and the notification signal comprises an identification number of the first electronic device for use in the second communication network;

receiving a linking request from the first electronic device through the second communication network;

responding to the linking request when the linking request contains the identification number of the first electronic device; and disconnecting the communication link between the first electronic device and the fourth electronic device via the first communication network.

23. The method of claim 22, further comprises transmitting the identification number of the fourth electronic device for use in the second communication network to the first electronic device before receiving the linking request.

24. The method of claim 22, wherein the linking request comprises the identification number of the first electronic device, then the fourth electronic device can automatically responds to the linking request.

25. The method of claim 22, wherein the linking request does not comprise the identification number of the first electronic device, then the fourth electronic device automatically rejects the linking request or the user manually decide whether to respond to the linking request.

26. The method of claim 22, wherein the first communication network is a computer network.

27. The method of claim 22, wherein the second communication network is a telephone network.

28. The method of claim 22, wherein the identification number of the first electronic device is a telephone number, a network IP address, an email address or an account number of the telecommunication software.

* * * * *